United States Patent [19]
Ito et al.

[11] Patent Number: 5,723,932
[45] Date of Patent: Mar. 3, 1998

[54] DC MOTOR WITH IMPROVED BRUSHES AND LIQUID PUMP USING THE SAME

[75] Inventors: Motoya Ito, Hekinan; Minoru Yasuda, Chiryu; Takeshi Matsuda, Anjo, all of Japan

[73] Assignee: Nippondenso Co., Ltd., Kariya, Japan

[21] Appl. No.: 665,237

[22] Filed: Jun. 17, 1996

[30] Foreign Application Priority Data

Jun. 16, 1995 [JP] Japan ................................ 7-148516
May 15, 1996 [JP] Japan ................................ 8-119417

[51] Int. Cl.$^6$ .................................................. H02K 23/00
[52] U.S. Cl. ....................... 310/248; 310/251; 310/239; 310/247; 310/245; 417/423.7
[58] Field of Search ................... 417/423.7; 310/242, 310/238, 239, 240, 241, 244, 245, 246, 247, 248, 251, 252

[56] References Cited

U.S. PATENT DOCUMENTS

| | | | |
|---|---|---|---|
| 4,344,008 | 8/1982 | Major et al. | 310/242 |
| 4,567,414 | 1/1986 | Berings | 310/243 |
| 4,835,432 | 5/1989 | De Pasquale | 310/242 |
| 5,081,386 | 1/1992 | Iwai | 310/87 |
| 5,088,900 | 2/1992 | Yoshioka et al. | 310/90 |
| 5,131,822 | 7/1992 | Yamamoto et al. | 310/245 |

FOREIGN PATENT DOCUMENTS

| | | |
|---|---|---|
| 6-48377 | 4/1985 | Japan . |
| 3-7665 | 2/1988 | Japan . |
| 63-24972 | 2/1991 | Japan . |

*Primary Examiner*—Thomas M. Dougherty
*Assistant Examiner*—B Mullins
*Attorney, Agent, or Firm*—Nixon & Vanderhye, P.C.

[57] ABSTRACT

A liquid pump has a DC motor and a pump in a cylindrical casing. A pair of brushes are slidably contacted with a commutator of an armature while being biased by springs. The specific resistance of the positive brush is lower than the specific resistance of the negative brush to enable the voltage drop at the brushes to be decreased and motor efficiency to be increased without increasing commutator wearing speed. The biasing force provided by the spring biasing the positive brush is lower than the biasing force provided by the spring biasing the negative brush.

18 Claims, 4 Drawing Sheets

COMMUTATOR CONTACT CIRCUMFERENCE

COMMUTATOR CONTACT CIRCUMFERENCE 5,723,932

1

DC MOTOR WITH IMPROVED BRUSHES AND LIQUID PUMP USING THE SAME

BACKGROUND OF THE INVENTION

1. Field of the Invention

This invention relates to an electric direct current motor, and more particularly, to a direct current motor for use in a liquid pump which forcibly feeds fuel within a liquid tank to a liquid consuming device.

2. Related Art

Various direct current (DC) motors for fuel pumps for internal combustion engines are known well in the art such as Japanese Utility Model Laid-Open Publication Nos. Hei 3-7665 and Sho 63-24972.

In Hei 3-7665, two sets of brushes having different specific resistances are installed on a DC motor for a fuel pump. The brush set having a high specific resistance is used when the engine does not require a large amount of fuel. The electrical current flowing to the DC motor is therefore reduced so as to reduce commutator wear. Only when the engine requires a large amount of fuel, the brush set having a low specific resistance is used to increase the electrical current flowing to the DC motor.

In Sho 63-24972, the sliding contact area of the anode (i.e., positive) brush of one pair of commutator brushes having the same specific resistance is larger than the sliding contact area of the cathode (i.e., negative) brush. Thus, the electrical resistance of the sliding contact surface between the anode brush and the commutator is reduced, motor efficiency is improved and at the same time commutator wear is reduced.

However, arrangement of the two sets of brushes having different specific resistances as in Hei 3-7665 has disadvantages in that the number of component parts is increased and the structure of the brush holders becomes complicated.

In addition, forming the sliding contact area of the anode brush of one pair of brushes larger than a sliding contact area of the cathode brush as in Sho 63-24972 has a disadvantage in that the fuel pump becomes larger in size due to an increased volume of the brush holder.

SUMMARY OF THE INVENTION

The present invention has an object of solving the above described disadvantages.

The present invention has another object of providing a direct current motor capable of improving motor efficiency by restricting commutator wear without increasing the number of component parts or complicating the brush holder.

The present invention has a further object of providing a direct current motor for a liquid pump such as a fuel pump.

According to the present invention, at least a pair of brushes are slidably contacted by a biasing spring force towards a commutator (and electrical current is supplied from the brushes to an armature coil through the commutator). The specific resistance of the anode brush is lower than the specific resistance of the cathode electrode. Thus, a voltage drop caused by sliding contact between the brushes and the commutator can be decreased without any remarkable increase in the amount of electrical wear between the anode brush and the commutator.

Preferably, the spring biasing force for the cathode brush is larger than the spring biasing force for the anode brush.

More preferably, the anode brush, the cathode brush and the commutator are immersed in liquid (such as fuel) so that

2 mechanical commutator wear is kept low compared with electrical commutator wear. In the case of the fuel pump, fuel is forcibly fed from one end within a casing to the other end by rotationally driving a vane wheel or impeller by a rotating armature shaft within the casing.

BRIEF DESCRIPTION OF THE DRAWINGS

Other features and advantages of the present invention will become more apparent from the following description when read with reference to the accompanying drawings, in which.

DETAILED DESCRIPTION OF THE PRESENTLY PREFERRED EMBODIMENTS

Figure 1:
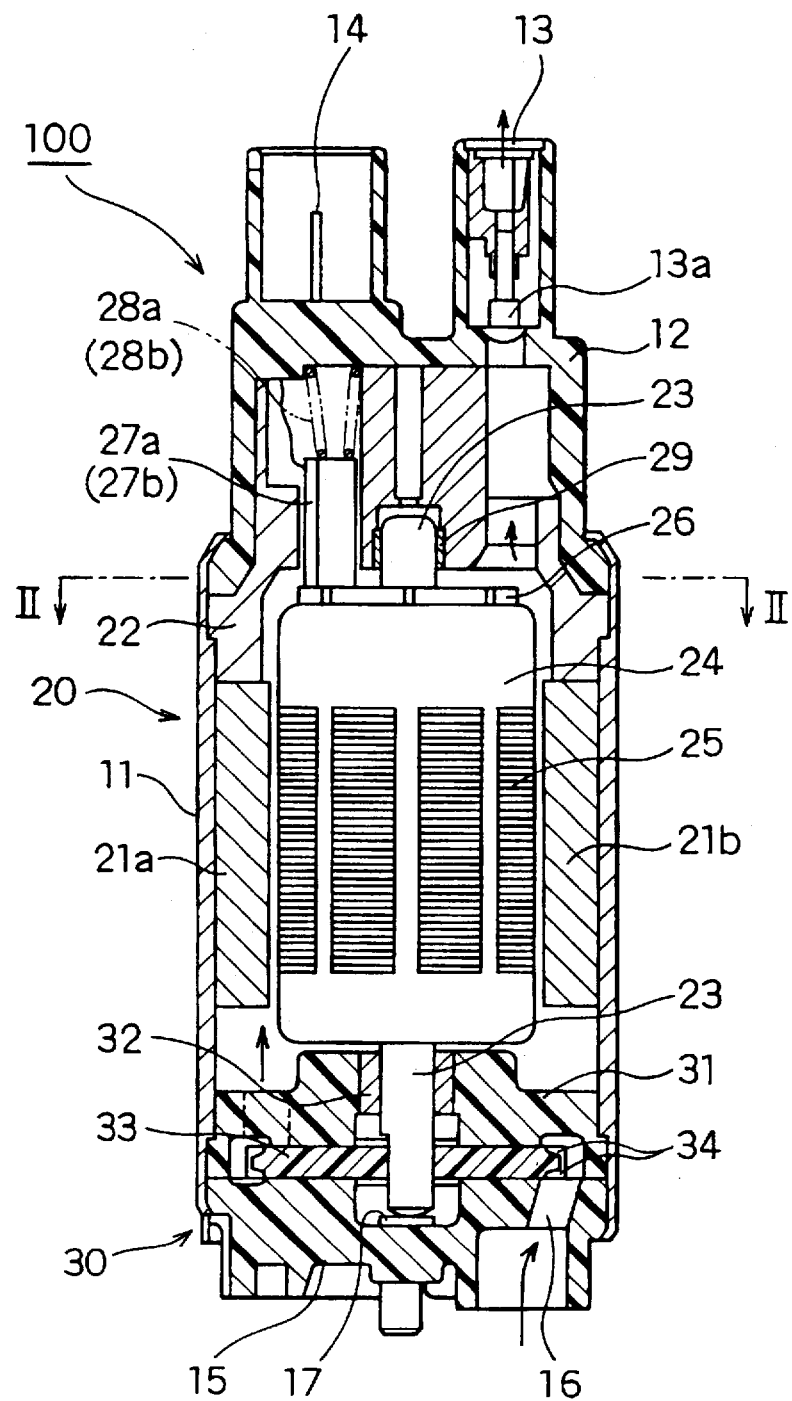
FIG. 1 is a longitudinal sectional view showing an exemplary fuel pump using a direct current motor according to one preferred embodiment of the present invention.

Referring now to the drawings, preferred embodiments of the present invention will be described below.

Figure 2:
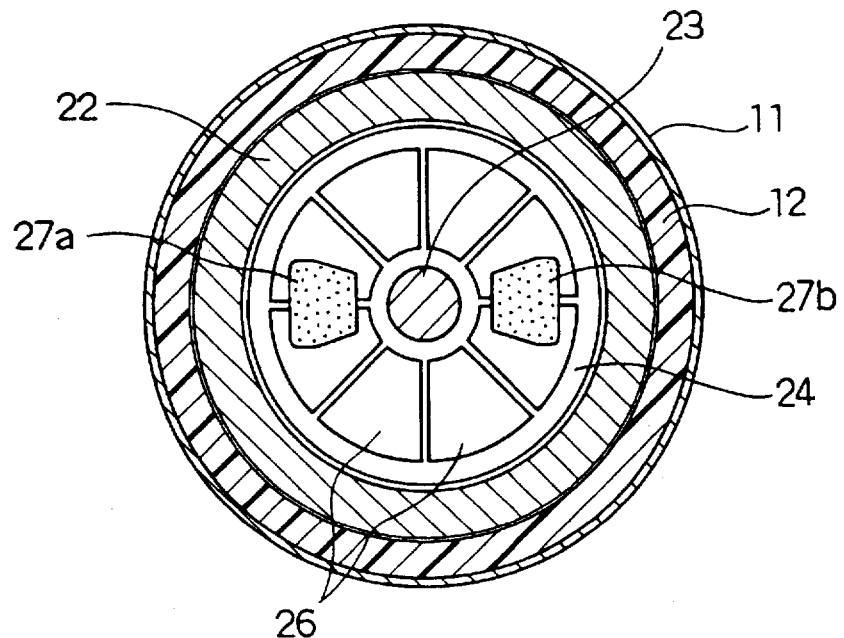
FIG. 2 is a sectional view taken along a line II—II in FIG. 1.

FIG. 1 is a sectional view showing a fuel pump using a direct current motor according to one preferred embodiment of the present invention. FIG. 2 is a sectional view taken along a line II—II in FIG. 1.

In FIGS. 1 and 2, reference numeral 100 denotes a fuel pump as a liquid pump. The fuel pump 100 is constructed such that a top cover 12 and a bottom cover 15 are integrally press fitted to each other by a cylindrical casing 11. A direct current (DC) motor 20 and a pump 30 are housed in the casing 11. The top cover 12 is formed with a fuel discharge port 13 having a check valve 13a, and a connector 14 for supplying electrical current to the DC motor 20. In addition, the bottom cover 15 is formed with a fuel suction port 16 through which fuel is sucked and fed along the direction of arrows shown in FIG. 1 and then discharged out of the discharge port 13.

The DC motor 20 includes a pair of magnets 21a, 21b fixed to the inner circumferential surface of casing 11 through motor housing 22. Armature 24 has a predetermined clearance with respect to magnets 21a, 21b and has a longitudinally extending rotating shaft 23 at the radial center of the casing 11. The armature 24 includes an armature coil 25 having a coil of wire wound around an iron core and a disk-like commutator 26 to which each of the coil wire ends of the coil part 25 is connected. The commutator disk is perpendicular to rotating shaft 23 and is integrally formed with resin into columnar member. The commutator 26 rotates while slidably contacting a pair of brushes 27a, 27b guided by the motor housing 22. Biasing forces are applied to the brushes by respective springs 28a, 28b. The brushes are wired to the connector part 14. As described later in detail, the brushes 27a, 27b have respectively different specific resistances and the springs 28a, 28b have respectively different biasing forces.

The pump 30 is a regenerative pump. The pump includes a turbine vane (impeller) 33 having at its outer circumference a vane 34 arranged between the bottom cover 15 within the casing 11 and a pump cover 31 press fitted integrally with the casing 11. This turbine vane 33 is engaged with an extended extremity of the rotating shaft 23 in its rotating direction and fitted to it in such a way that it may be axially slid.

The DC motor 20 of the present preferred embodiment is an 8-pole motor. Its rotating shaft 23 is rotationally supported in a radial direction by a bearing 29 fitted and installed at the motor housing 22 and a bearing 32 fitted and installed at the pump cover 31. The rotating shaft 23 is supported in a thrust direction by an abutting member 17 fixed to the bottom cover 15 and by the brush 27a, 27b.

Figure 3A:
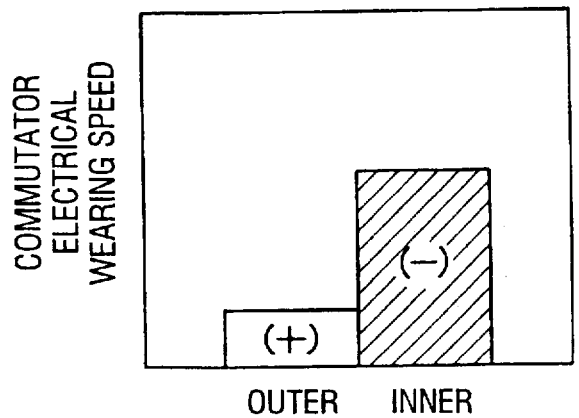
FIGS. 3(a) and 3(b) are graphs showing electrical commutator wearing speed caused by an anode brush and a cathode brush.
Figure 3B:
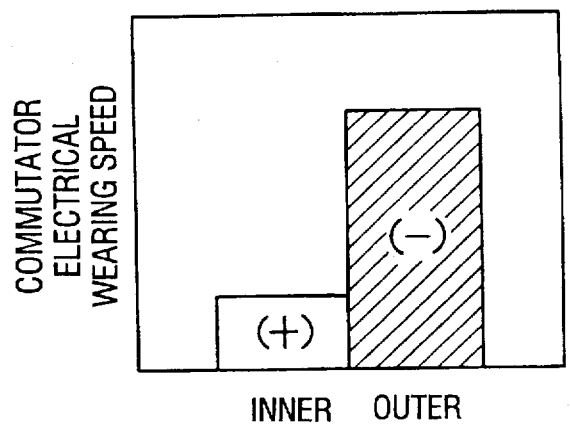

Shown in FIGS. 3(a) and 3(b) are an experiment performed by the present inventors as well as its results in order to measure actual electrical wear caused by sparks generated between commutator 26 and brushes 27a, 27b when the fuel pump 100 according to this embodiment is used. Since the fuel pump 100 in the preferred embodiment of the present invention is operated while being immersed in fuel, the commutator 26 and brushes 27a, 27b are also always immersed in the fuel. Since it is known that mechanical wear caused by friction between both members under this condition is quite low as compared with electrical wear between them, the mechanical wear in this case will not be considered.

In this case, if it is assumed that brushes 27a, 27b are slidably contacted on the same circumference of the commutator 26 as shown in FIG. 2, it is not apparent which one of the brushes, i.e., the positive electrode (hereinafter merely defined as (+)) or the negative electrode (hereinafter merely defined as (−)) causes more or less electrical wear of the commutator 26. Accordingly, for the experiment, the brushes having each of their contact surfaces cut in an arcuate shape were manufactured in such a way that the brush at the (+) electrode and the brush at the (−) electrode were placed to slidably contact different circumferential areas on the commutator 26. Two sets of brushes, i.e., one set of brushes having each polarity was placed at an inner circumference and the other set of brushes having each polarity was placed at an outer circumference (e.g., because of different inner and outer peripheral speeds, each of the combined units was evaluated).

FIG. 3(a) indicates commutator wearing speed when the brush of (−) electrode is arranged at the inner circumference and the brush of (+) electrode being arranged at the outer circumference. FIG. 3(b) indicates commutator wearing speed when the brush at the (+) electrode is arranged at the inner circumference and the brush at the (−) electrode being arranged at the outer circumference.

As apparent from FIGS. 3(a) and 3(b), in either case, the commutator wearing speed caused by the brush at the (−) electrode is about three times the wearing speed caused by the brush at the (+) electrode. Although the brush at the (+) electrode and the brush at the (−) electrode were made of material having a relatively high specific resistance in the prior art in order to assure a service life of the commutator 26, in view of the above described result, it is now seen to be possible to reduce the voltage drop at the brush at the (+) electrode while still maintaining full brush set service life by setting a lower specific resistance at the brush of the (+) electrode than a specific resistance of the brush at the (−) electrode.

Figure 4:
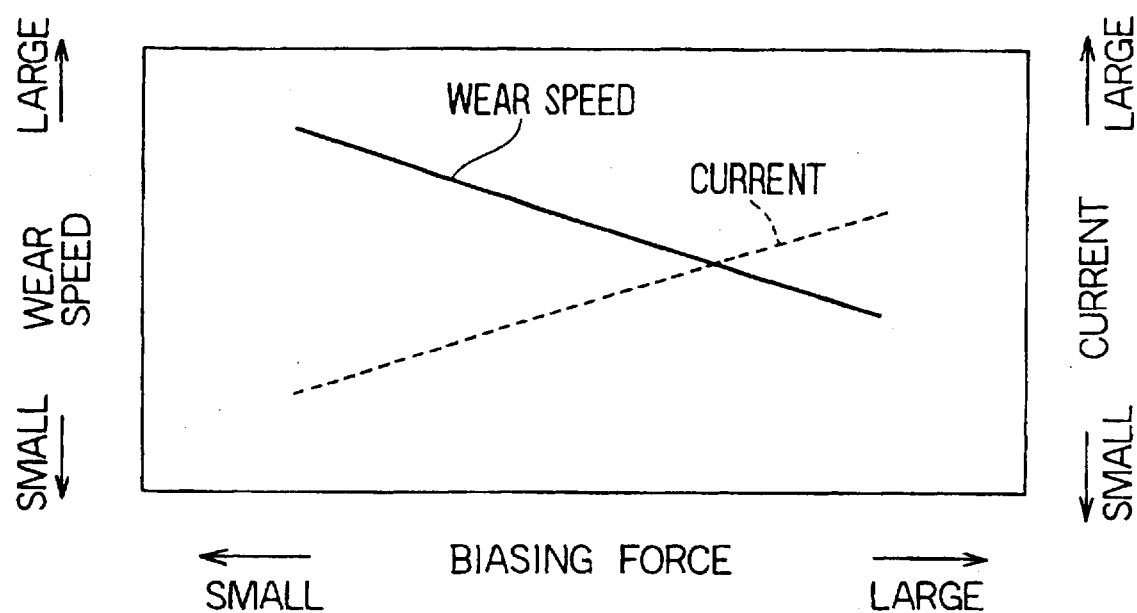
FIG. 4 is a graph showing the general relationship between commutator wearing speed and electrical current versus spring biasing force.

In addition, the spring biasing force at either the brush at the (+) electrode or the brush at the (−) electrode was changed to see what kind of influence was caused by the biasing forces of the springs to both electrical wearing and electrical current of the commutator 26. As shown in FIG. 4, it became apparent that an increase in the spring biasing force enables commutator wearing speed to be decreased and, in turn, this enables electrical current to be increased. Accordingly, it is possible to permit an increase in electrical current while also restricting commutator wearing speed by increasing the biasing force of only the spring at the (−) brush—thus substantially influencing against the excessive commutator wearing speed otherwise to be expected at the (−) brush.

Here, in this experiment, each cross sectional area of the brushes at the (+) electrode and the (−) electrode in the prior art product and the present preferred embodiment is 0.224 square centimeters, respectively. It is assumed that increased biasing force caused contact pressure of the brush against the commutator to be increased, resulting in a reduction of electrical sparks between the brush and the commutator and, as a consequence, the commutator wearing speed was decreased. In addition, it is assumed that increased contact pressure caused the contact resistance to be reduced and this caused the electrical current to be increased.

Figure 5:
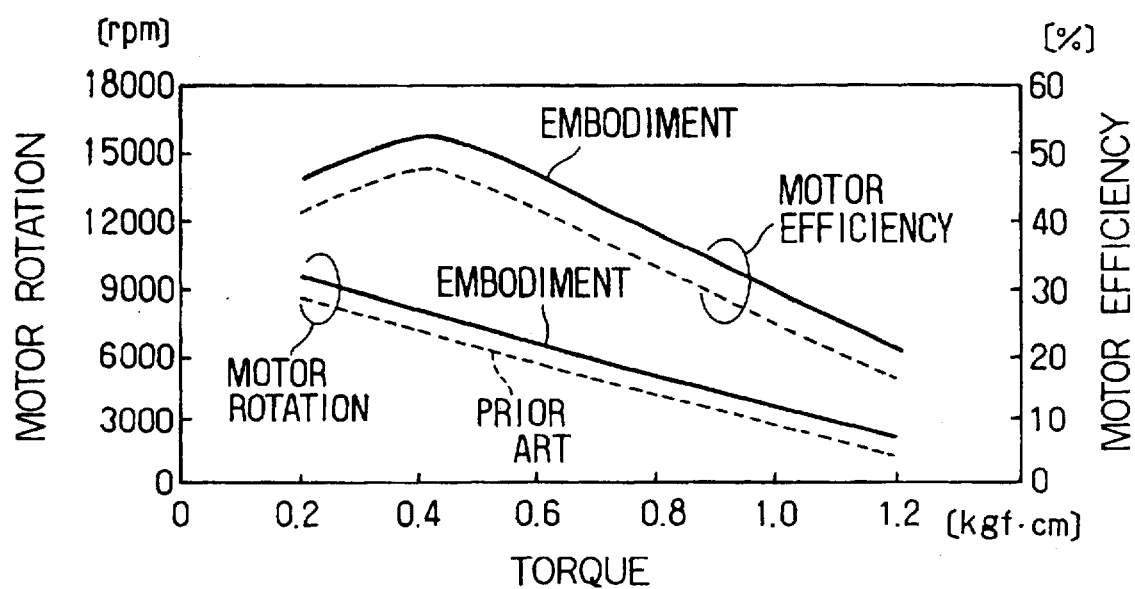
FIG. 5 is a graph showing motor efficiencies in the fuel pump of the preferred embodiment.

In response to the results of the foregoing experiments, the specific resistance of the brush at the (+) electrode of the brushes 27a, 27b is preferably made lower than the specific resistance of the brush at the (−) electrode. Further, the spring biasing force for the brush at the (−) electrode of the springs 28a, 28b preferably made larger than the spring biasing force of the brush at the (+) electrode. With such an arrangement, as shown in FIG. 5, it becomes possible to improve motor efficiency of the present preferred embodiment as compared with that of the prior art.

In the prior art product in the experiment, the specific resistance of the brushes was 1,000 μΩcm for both (+) electrode and (−) electrode and the biasing force of the brush springs was 150 g. In the presently preferred embodiment in the experiment, the brush specific resistance for the (+) electrode was 2,000 μΩcm while the brush specific resistance for the (−) electrode was 10,000 μΩcm, and the biasing force of the brush spring for the (+) electrode was 150 g while the biasing force of the brush spring for the (−) electrode was 350 g.

As described above, at the DC motor 20, a pair of brushes 27a, 27b are slidably contacted with the disk commutator 26 arranged at the end of armature 24 through the biasing forces of springs 28a, 28b. An electrical current is supplied from the brushes 27a, 27b to the coil 25 of the armature 24 through the commutator 26. The fuel at the pump 30 is forcibly fed from the suction port 16 at one end within the casing to the discharge port 13 at the other end under rotational driving of the vane wheel including turbine vane 33 driven by the rotating shaft 23 of the armature 24 within the casing 11. The specific resistance of the brush at the (+) electrode in these brushes is set to be lower than the specific resistance of the brush at the (−) electrode. Therefore, it is possible to reduce the voltage drop caused by the sliding contact without causing a large electrical commutator wearing rate between the brush at the (+) electrode and the commutator. Due to this fact, it is possible to restrict wearing of the commutator or to improve motor efficiency without increasing the number of component parts of the fuel pump or making a complex structure of the brush holder.

Further, at the DC motor 20, a pair of brushes 27a, 27b arranged at the casing 11 are slidably contacted with the commutator 26 arranged at the end of armature 24 through the biasing forces of springs 28a, 28b. An electrical current is supplied from brushes 27a, 27b to the coil 25 of the armature 24 through the commutator 26. The fuel at the pump 30 is forcibly fed from the suction port 16 at one end within the casing to the discharge port 13 at the other end under rotational driving of the vane wheel including turbine vane 33 driven by the rotating shaft 23 of the armature 24 within the casing 11. The biasing force of the spring at the brush of the (−) electrode of these springs 28a, 28b is set to be larger than the biasing force of the spring at the brush of the (+) electrode. Therefore, it is possible to reduce the commutator wearing rate with the brush at the (−) electrode and to restrict an increase of electrical current. Due to this fact, it is possible to restrict wearing of the commutator and to improve motor efficiency without making a complex structure of the brush holder.

In addition, since the liquid pump (e.g., a fuel pump) is immersed in the liquid (e.g., fuel), mechanical wear caused by friction between both the brushes 27a, 27b immersed in the fuel and the commutator 26 is quite low as compared with electrical wear. Due to this fact, the liquid pump in which the brushes 27a, 27b and the commutator 26 are immersed in the liquid enables a service life of the commutator or the like to be remarkably improved merely by providing a countermeasure against electrical wearing.

Figure 6:
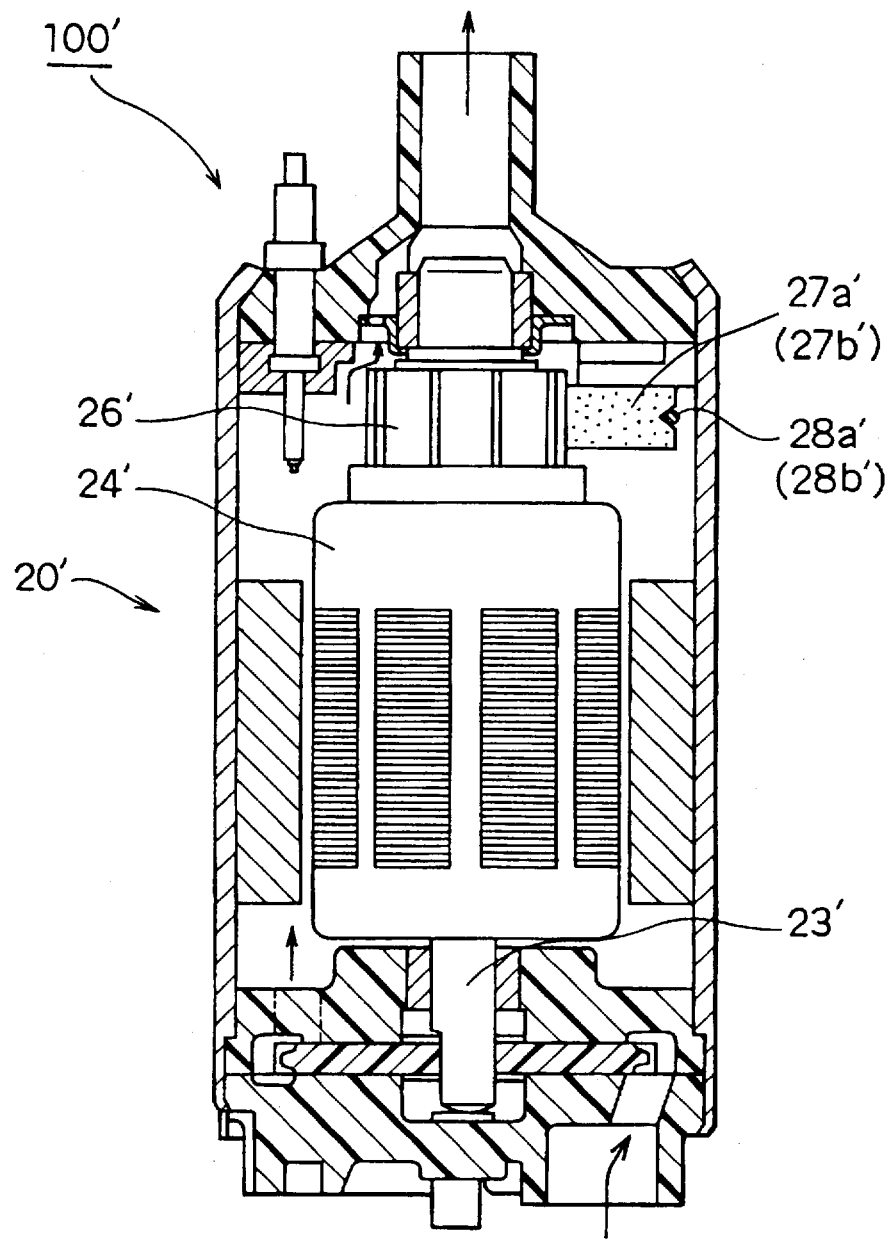
FIG. 6 is a longitudinal sectional view showing a modification in arrangement of the commutator and the brushes in the fuel pump of FIG. 1.

In the foregoing preferred embodiment, the commutator 26 is arranged like a disk in a direction perpendicular to the rotating shaft 23 of the armature 24 and the DC motor 20 supplied with electricity through the brushes 27a, 27b biased by the springs 28a, 28b. However, it may be modified to a liquid pump such as a fuel pump 100', as shown in FIG. 6, in which a commutator 26', is arranged coaxially to the rotating shaft 23', of an armature 24' and in a cylindrical manner. A DC motor 20', is supplied with electric current through brushes 27a', 27b', biased by springs 28a', 28b' in the radial direction.

In addition, although the DC motor of the present invention has been applied to the regenerative type pump in the preferred embodiment, it may also be applied to various types of pumps, e.g., geared pumps or vane pumps.

Further, the present invention may be modified in many other ways without departing from the spirit of the invention.

What is claimed is:

1. A direct current motor for a liquid pump comprising:

a casing;

an armature with a coil and a commutator at an end of the armature in the casing;

positive and negative brushes arranged in the casing in slidable contact with the commutator for supplying current to the commutator; and biasing springs for biasing the brushes onto the commutator, wherein the brushes and the biasing springs are set to satisfy at least one of the conditions of: (1) the positive brush has a lower specific resistance than the negative brush's specific resistance and (2) the biasing spring for the positive brush has a lower biasing force than the negative brush biasing spring's biasing force.

2. A liquid pump as in claim 1, wherein the negative brush and the positive brush are substantially the same size.

3. A liquid pump comprising:

a DC motor including a casing, an armature with a coil and a commutator at an end of the armature in the casing, at least a pair of positive and negative brushes arranged in the casing in slidable contact with the commutator for current supply to the commutator, and biasing springs for biasing the brushes onto the commutator; and a pump driven by the DC motor for forcibly feeding liquid from one end to another end in the casing, wherein the positive brush has a specific resistance that is lower than the negative brush's specific resistance.

4. A liquid pump as in claim 3, wherein:

the spring for the negative brush provides a biasing force that is larger than the positive brush spring's biasing force.

5. A liquid pump as in claim 4, wherein:

the positive and negative brushes and the commutator are immersed in a liquid.

6. A liquid pump as in claim 5, wherein the liquid is a fuel.

7. A liquid pump as in claim 3, wherein the negative brush and the positive brush are substantially the same size.

8. A liquid pump comprising:

a DC motor including a casing, an armature with a coil and a commutator at an end of the armature in the casing, a first brush, and a second brush arranged in the casing in slidable contact with the commutator for current supply to the commutator, and first and second biasing springs for biasing the first and second brushes onto the commutator, respectively; and a pump driven by the DC motor for forcibly feeding liquid from one end to another end in the casing, wherein the first spring for biasing the first brush provides a biasing force that is larger than a biasing force provided by the second spring for biasing the second brush.

9. A liquid pump as in claim 8, wherein:

the first brush is a negative brush and the second brush is a positive brush.

10. A liquid pump as in claim 9, wherein:

the positive brush has a specific resistance that is lower than the negative brush's specific resistance.

11. A liquid pump as in claim 10, wherein:

the positive and negative brushes and the commutator are immersed in a liquid.

12. A liquid pump as in claim 11, wherein the liquid is a fuel.

13. A liquid pump as in claim 9, wherein the negative brush and the positive brush are substantially the same size.

14. A direct current motor for a liquid pump comprising:

an armature with a coil connected to a commutator;

a positive brush and a negative brush of substantially equal sizes, both said brushes being in slidable contact with the commutator, the positive brush having a lower specific resistance than the negative brush's specific resistance; and biasing springs for biasing the brushes onto the commutator, the biasing spring for the positive brush having a lower biasing force than the negative brush biasing spring's biasing force.

15. A liquid pump as in claim 14, wherein the negative brush, the positive brush and the commutator are immersed in a liquid in operation.

16. A liquid pump as in claim 15, wherein the liquid is a fuel.

17. A direct current motor having improved efficiency and reduced commutator wear, said motor comprising:

an armature with a coil connected to a commutator;

a positive brush and a negative brush arranged in slidable contact with the commutator, the positive brush having a lower specific resistance than the negative brush's specific resistance; and biasing springs for biasing the brushes onto the commutator, the biasing spring for the positive brush having a lower biasing force than the negative brush biasing spring's biasing force.

18. A direct current motor as in claim 17, wherein the negative brush and the positive brush are substantially equal sizes.

* * * * *